United States Patent [19]
Moore

[11] Patent Number: 5,939,631
[45] Date of Patent: Aug. 17, 1999

[54] LOW IMPEDANCE SINGLE-ENDED TUNING FORK AND METHOD

[75] Inventor: Robert H. Moore, Antioch, Calif.

[73] Assignee: BEI Technologies Inc., Concord, Calif.

[21] Appl. No.: 09/040,231

[22] Filed: Mar. 13, 1998

[51] Int. Cl.[6] .................................................. G01P 9/04
[52] U.S. Cl. ........................................................ 73/504.16
[58] Field of Search ........................... 73/504.16, 504.12, 73/504.15; 310/329, 370; 29/25.35

[56] References Cited

U.S. PATENT DOCUMENTS

| 5,329,816 | 7/1994 | Söderkvist et al. | 73/504.16 |
| 5,420,548 | 5/1995 | Nakajima | 73/504.16 |

*Primary Examiner*—John E. Chapman
*Attorney, Agent, or Firm*—Flehr Hohbach Test Albritton & Herbert

[57] ABSTRACT

Single-ended tuning fork and method in which a body of piezoelectric material is formed with a base and a pair of elongated vibratory tines extending from the base, and drive and pickup electrodes are positioned side-by-side on the tines at substantially equal distances from the base.

14 Claims, 4 Drawing Sheets

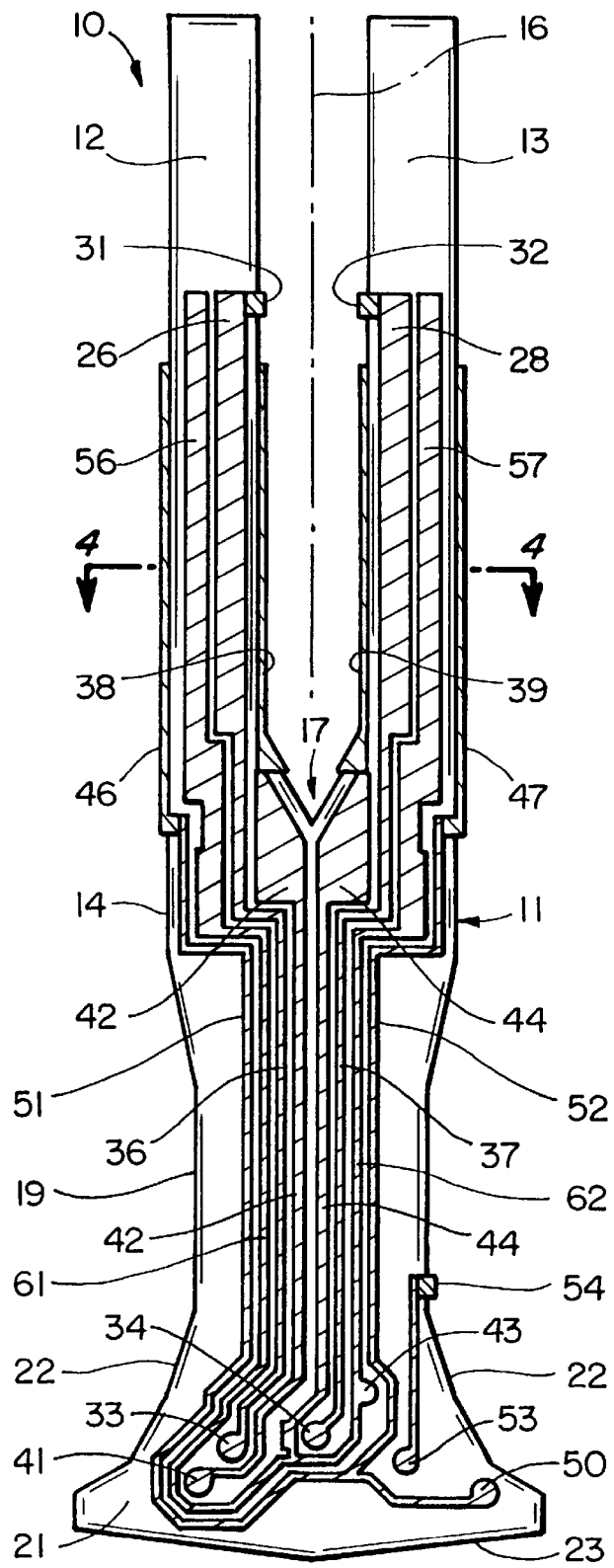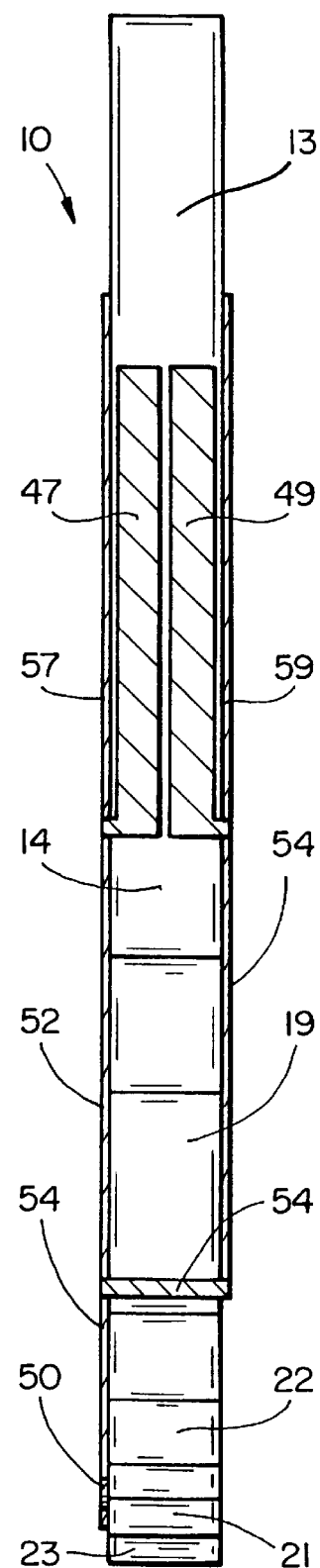
FIG_1  FIG_3

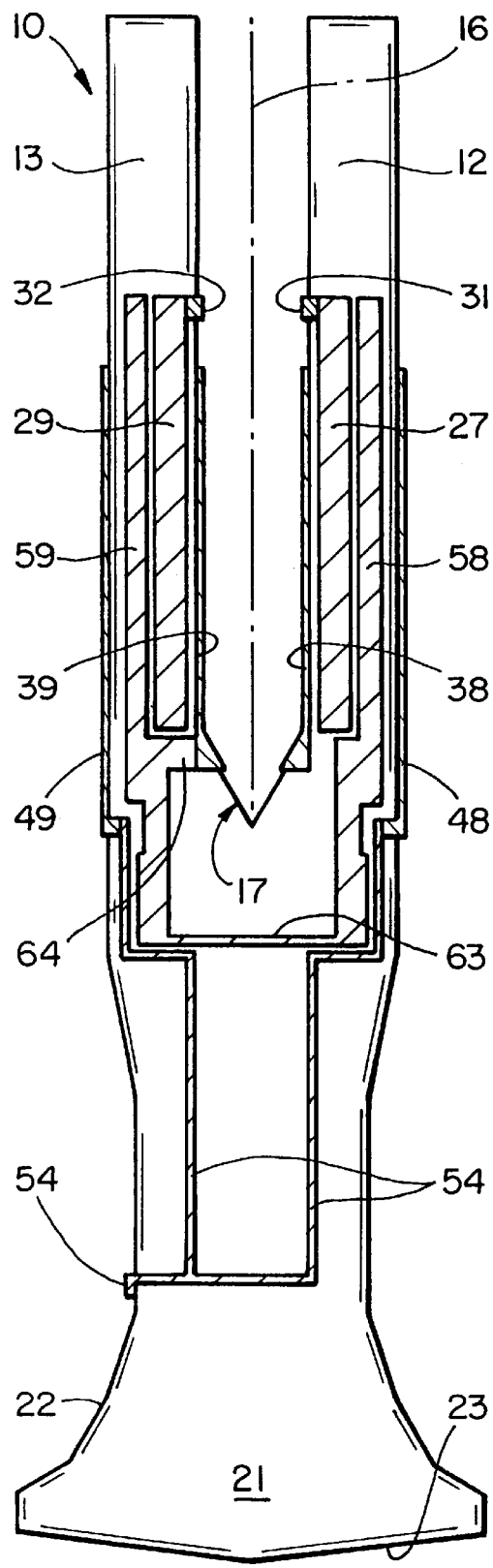
FIG_2
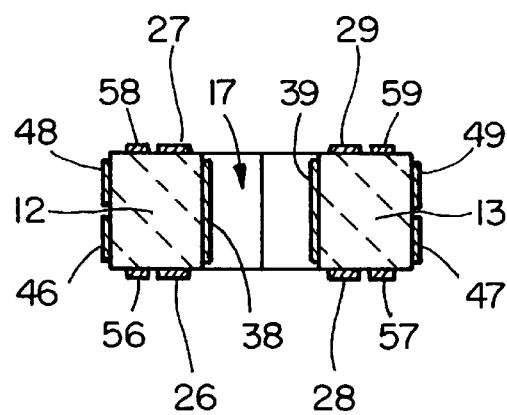
FIG_4

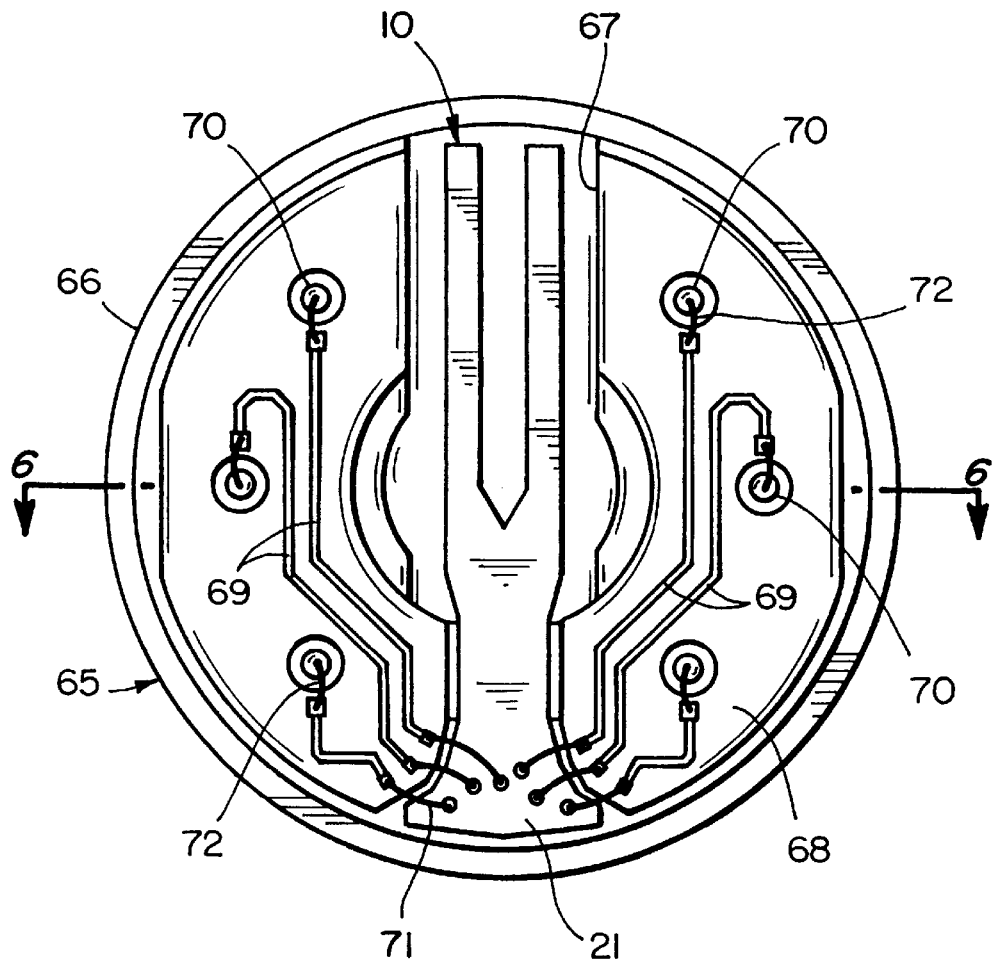
FIG_5
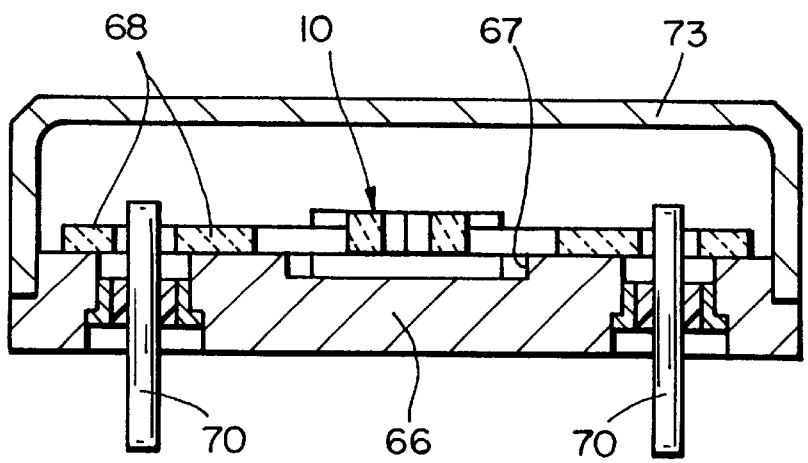
FIG_6

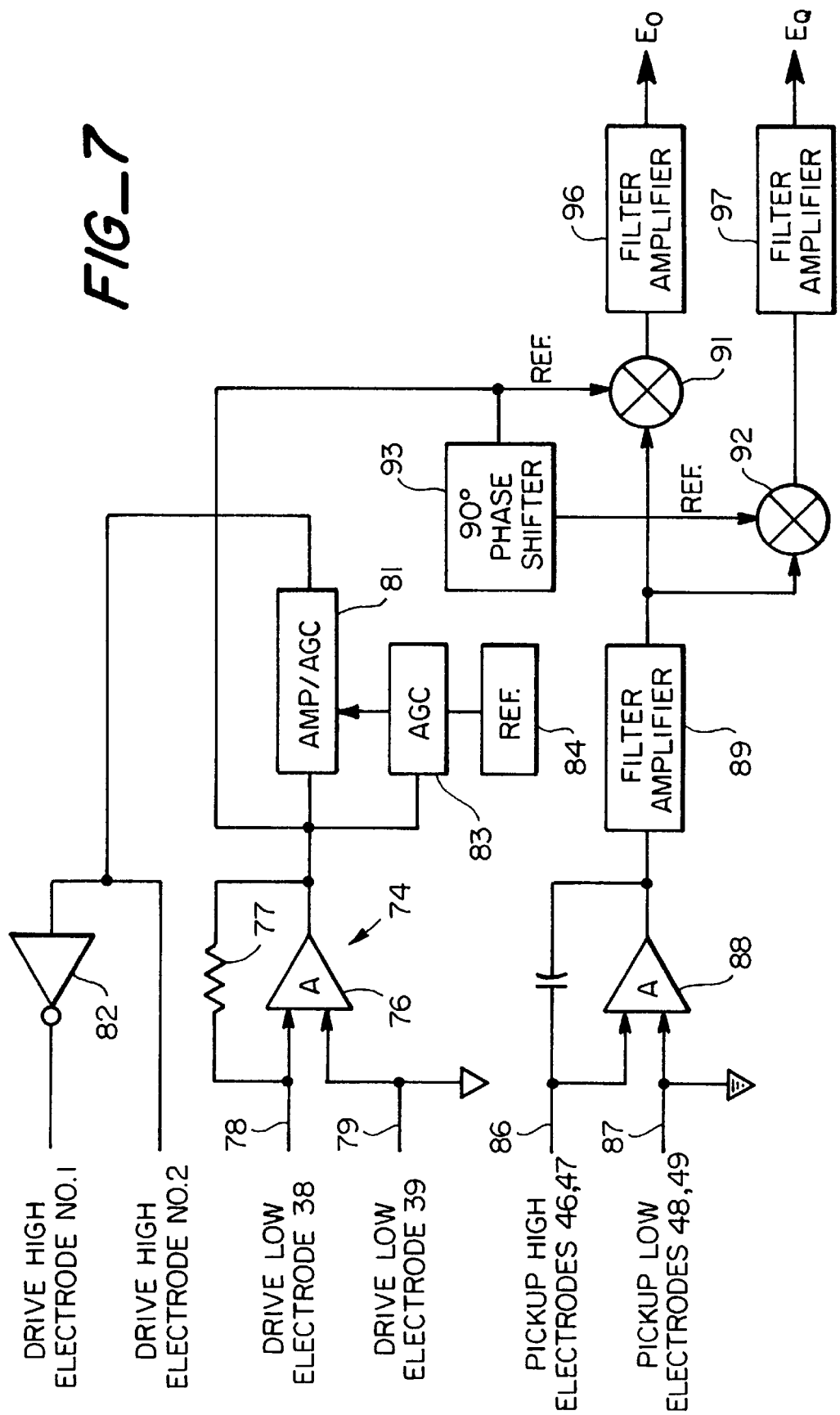

LOW IMPEDANCE SINGLE-ENDED TUNING FORK AND METHOD

This invention pertains generally to inertial sensors and, more particularly, to a low impedance single-ended tuning fork and method for use in an inertial sensor.

U.S. Pat. Nos. 5,343,749 and 5,408,876 disclose an inertial rate sensor and method using a single-ended tuning fork. In this tuning fork and other tuning forks of the prior art, drive and pickup electrodes are located in different regions of the tines. In the devices shown in these two patents, the pickup electrodes are located toward the base of the tines, and the drive electrodes are located are located toward the free ends of the tines. U.S. Pat. No. 5,388,458 shows a tuning fork in which the drive electrodes are located toward the base of the tines, and the pickup electrodes are positioned toward the free ends.

Heretofore, it has been thought that optimum performance requires that the drive and pickup electrodes each encompass both plus and minus crystallographic x-axis edges of the tines. Thus, for example, the tuning forks shown in U.S. Pat. Nos. 5,343,749 and 5,408,876 have both drive low electrodes and pickup electrodes on both the inside edges and the outside edges of the tines.

Locating the drive and pickup tines in different regions forces either the drive electrodes or the pickup electrodes to be positioned relatively far from the base of the tines. As a result, the piezoelectric coupling between the body of the tuning fork and the electrodes will be much weaker for one set of electrodes than for the other. In the tuning forks shown in U.S. Pat. Nos. 5,343,749 and 5,408,876, the drive electrodes were positioned farther from the base because it was believed that the reduced coupling toward the free ends of the tines could be offset by increasing the drive voltage.

The reduced coupling reduces both the input coupling between the applied voltages and resulting stress in the piezoelectric material and the output coupling between the applied stress and the resulting charge or electrical current. Thus, the overall transfer function of the input voltage and output current is degraded as the product of the two reductions in coupling. This has the effect of increasing the electrical impedance of the device (i.e., applied voltage vs. measured current) by an amount which is typically greater than an order of magnitude.

The high drive impedance results in less reliable oscillation start-up in the correct mode. This occurs because the drive mode resonance is reduced in signal level by the same factor as the impedance is increased, thereby degrading the signal-to-noise ratio in the drive oscillator loop. With nothing to prevent mode coupling to undesired modes such as the first overtone, the oscillator can start up in the wrong mode unless undesirable bandpass elements are included in the drive loop circuit. The high impedance also increases turn-on time, which necessitates precise and time consuming calibration of components to assure proper turn-on.

Conversely, when the drive electrodes are located near the base of the tines and the pickup electrodes are located farther from the base, the signal sensing capability of the pickup electrodes is decreased. Moreover, since the drive electrodes are generally shortened with respect to their optimum length, coupling to higher order modes such as the first overtone drive mode is not optimized. Also, as can be seen in U.S. Pat. No. 5,388,458, the routing of traces becomes more complicated with this arrangement.

It is in general an object of the invention to provide a new and improved tuning fork and method for use in an inertial sensor.

Another object of the invention is to provide a tuning fork and method of the above character which overcome the limitations and disadvantages of the prior art.

These and other objects are achieved in accordance with the invention by providing a tuning fork and method in which a body of piezoelectric material is formed with a base and a pair of elongated vibratory tines extending from the base, and drive and pickup electrodes are positioned side-by-side on the tines at substantially equal distances from the base.

FIG. 1 is top plan view of one embodiment of a tuning fork incorporating the invention.

FIG. 2 is a bottom plan view of the embodiment of FIG. 1.

FIG. 3 is a side elevational view of the embodiment of FIG. 1.

FIG. 4 is a cross-sectional view taken along line 4—4 in FIG. 1.

FIG. 5 is a top plan view of one embodiment of a housing in which the tuning fork of FIG. 1 is mounted, with cover of the housing remove for clarity of illustration.

FIG. 6 is a cross sectional view taken along line 6—6 in FIG. 5.

FIG. 7 is a block diagram of one embodiment of a rate sensor utilizing the tuning fork of FIG. 1.

As illustrated in the drawings, the tuning fork 10 has a body 11 of piezoelectric material such as Z-cut quartz, lithium niobate, or another crystal or quartz-like material. The body is formed from a single piece of the material by a known process such as chemical etching.

The body includes a pair of elongated tines 12, 13 which extend in a longitudinal direction from a base 14 and are spaced symmetrically about an axis 16. The tines come together toward the base in a V-shaped crotch 17 with an acute crotch angle. With the acute angle, the etch facet which forms due to the etching properties of crystalline quartz is forced to recede down into the lower portion of the crotch where the tines are relatively stiff, thereby significantly reducing unwanted quadrature effects.

A stem 19 extends along the axis from the side of the base opposite the tines and terminates in a flared pedestal 21 which has tapered side edges 22 and a V-shaped end 23.

Drive high electrodes 26, 27 and 28, 29 are mounted on the front and rear surfaces of tines 12, 13, respectively. Electrodes 26, 27 are connected together at their upper ends by a lead 31 which wraps about the inner edge of tine 12 to form drive high electrode No. 1, and electrodes 28, 29 are connected together at their upper ends by a lead 32 which wraps about the inner edge of tine 13 to form drive high electrode No. 2. The lower ends of these electrodes are connected to pads 33, 34 on the front side of pedestal 21 by leads 36, 37, respectively.

The drive high electrodes are positioned toward the inner edges of the tines and extend a substantial distance from the base toward the free ends of the tines.

Drive low electrodes 38, 39 are mounted on the inner edges of the tines, with electrode 38 being connected to a drive low pad 41 on front side of the pedestal by a lead 42, and electrode 39 being connected to a ground pad 43 on the front side of the pedestal by a lead 44. The ground pad is connected externally to the case ground.

Pickup high electrodes 46, 47 extend along the outer edges of the tines near the upper surfaces of the tines, and pickup low electrodes 48, 49 extend along the outer edges near the lower surfaces. The lower ends of electrodes 46, 47 are connected to a pickup high pad 50 on the front side of pedestal 21 by leads 51, 52, and the lower ends of electrodes 48, 49 are connected to a pickup low pad 53 on the front side of the pedestal by a lead 54 which wraps about the side edge of the stem just above the pedestal.

Shielding between the drive and pickup electrodes is provided by ground electrodes 56, 57 and 58, 59 on the front and rear sides of the tines. Those electrodes are positioned between the drive high electrodes and the outer edges of the tines, and they are substantially coextensive in length with the drive high electrodes. The lower ends of electrodes 56, 57 are connected to ground pad 43 by leads 61, 62, and the lower ends of electrodes 58, 59 are connected together by a lead 63 on the bottom side of the fork. Electrodes 58, 59 are connected to the ground pad via a lead 64 which is connected between electrode 59 and drive low electrode 39 and by the lead 44 which is connected between electrode 39 and the ground pad.

The tuning fork can be used in a number of sensing applications, including an inertial sensor of the type found in U.S. Pat. Nos. 5,343,749 and 5,408,876, the disclosures of which are incorporated herein by reference.

FIGS. 5 and 6 illustrate the tuning fork 10 mounted in a short cylindrical housing 65 which includes a circular base 66 having a recessed area 67 formed on the upper side thereof. The recessed area is wider than the tuning fork and extends in a generally diagonal direction across the base. The pedestal 21 of the tuning fork is cemented to the upper surface of the base at one end of the recessed area, with the tuning fork extending diagonally across the base above the recessed area.

A ceramic circuit board 68 is mounted on the upper side of the base, with conductive traces 69 on the upper side of the board. Feedthrough connectors 70 extend through the base and pass through openings in the circuit board, and leads 71, 72 interconnect the circuit board traces with the leads on the tuning fork and the feedthrough connectors.

A cover 73 is welded to the base to form a hermetically sealed structure, with feedthrough connectors 70 projecting from the lower side of the housing for connection to the outside world.

FIG. 7 illustrates the circuitry of one embodiment of a rate sensor utilizing the tuning fork of FIG. 1. As illustrated, this circuitry includes a drive oscillator 74 which comprises a current amplifier 76 and a feedback resistor 77. The oscillator is connected to drive low electrodes 38, 39 via lines 78, 79.

The oscillator signal is applied to the input of an AGC controlled amplifier 81, and the output of this amplifier is connected to drive high electrode No. 2 and to the input of an inverter 82. The output of the inverter is connected to drive high electrode No. 1. The two drive high electrodes are thus driven in the high mode in closed loop fashion with 180° phasing.

The gain of amplifier 81 is controlled by an AGC circuit 83 which compares the output of current amplifier 76 with a DC voltage from a reference source 84. The AGC circuit maintains unity gain around the oscillator loop and thus provides continuous oscillation at a fixed amplitude.

Signals from pickup high electrodes 46, 47 and pickup low electrodes 48, 49 are applied via lines 86, 87 to the inputs of a charge amplifier 88. The output of the charge amplifier is amplified and filtered by a filter/amplifier 89, and applied to a pair of synchronous demodulators 91, 92. The signal from oscillator 74 is used as a reference for the demodulators, with the signal supplied to demodulator 92 being shifted 90° in phase by a phase shifter 93. The outputs of the demodulators are connected to filter/amplifiers 96, 97 which provide an output signals $E_O$ and $E_Q$. Output signal $E_O$ is a DC rate signal which is proportional in amplitude to the rate of rotation about the axis of the tuning fork, and signal $E_Q$ is a quadrature signal which is useful for testing and balancing purposes.

As in the tuning fork described in U.S. Pat. Nos. 5,343,749 and 5,408,876, the cross-sectional dimensions of the tines and the length and width of the stem are chosen to provide a small frequency difference (e.g., about 3 percent) between the drive and pickup modes. Thus, for example, the tuning fork might have a 10 KHz drive frequency and a 10.3 KHz pickup frequency.

The invention has a number of important features and advantages. It differs significantly from the tuning forks found in the prior art such as U.S. Pat. Nos. 5,343,749 and 5,408,876 in that the drive and pickup electrodes are positioned side-by-side and located substantially equal distances from the base rather than being located in different regions along the tines. With the drive electrodes located on the inner portions of the tines and the pickup electrodes located on the outer portions, both sets of electrodes can operate in the optimum coupling region near the base of the tines.

With the electrodes positioned side-by-side, both sets can be extended in length to make optimum use of the area available. Even though the total area available for driving and sensing is somewhat reduced, overall coupling is enhanced by the increased input and output coupling properties which result from having both sets of electrodes located near the base.

Undesired capacitive feedthrough coupling between the drive and pickup electrodes is minimized by the symmetrical arrangement of the electrodes. This tends to make equal amounts of positive and negative drive couple to the pickup electrodes, thus cancelling the net feedthrough. In addition, the grounded shielding between the electrodes further reduces coupling between them, and any net feedthrough capacitance can be nulled by trimming one or more of the ground shields to exactly equalize the positive and negative feedthrough components. This also permits the effect of small asymmetries resulting from variations in the fabrication process to be corrected.

Having the pickup electrodes located on the outer edges of the tines facilitates laser trimming of the electrode areas to null quadrature bias, and this can be accomplished without having to resort to mass balancing.

Also, as can be seen by comparing this tuning fork with tuning forks with the electrodes located in different regions along the tines, having both sets of electrodes positioned side-by-side near the base substantially simplifies the routing of the leads and makes the device easier to manufacture.

The single-ended fork can be scaled to different sizes as required for different applications. Although the nominal drive frequency for rate sensor applications is typically on the order of 9–20 KHz, higher frequencies can easily be accommodated either by making the fork smaller or by other minor design modifications.

The low impedance design has been found to significantly improve the reliability of oscillator start-up and to greatly simplify calibration of the rate sensor.

It is apparent from the foregoing that a new and improved tuning fork and method have been provided. While only certain presently preferred embodiments have been described in detail, as will be apparent to those familiar with the art, certain changes and modifications can be made without departing from the scope of the invention as defined by the following claims.

I claim:

1. In a tuning fork for use in an inertial sensor: a body of piezoelectric material having a base and a pair of elongated vibratory tines extending from the base, a pair of drive high electrodes located opposite each other on front and rear surfaces of each of the tines, drive low electrodes positioned laterally adjacent to the drive high electrodes along edges of the tines, and pickup high and pickup low electrodes extending along edges of the tines opposite the drive low electrodes, with all of the electrodes being located substantially equidistant from the base.

2. The tuning fork of claim 1 wherein the tines are positioned symmetrically about a longitudinally extending axis.

3. The tuning fork of claim 1 including means for applying a drive signal to the drive electrodes, and means connected to the pickup electrodes for processing signals induced therein.

4. The tuning fork of claim 1 wherein the tines come together in a V-shaped crotch toward the base.

5. In a tuning fork for use in an inertial sensor: a body of piezoelectric material having a base and a pair of elongated vibratory tines extending from the base, a pair of drive high electrodes located opposite each other on front and rear surfaces of each of the tines, drive low electrodes positioned laterally adjacent to the drive high electrodes along inner edges of the tines, and pickup high and pickup low electrodes extending along outer edges of the tines laterally opposite the drive low electrodes, with all of the electrodes being located substantially equidistant from the base.

6. The tuning fork of claim 5 including ground electrodes positioned on the upper and lower surfaces of the tines between the drive high electrodes and the outer edges of the tines, the ground electrodes being substantially coextensive in length with the drive high electrodes and providing shielding between the drive high electrodes and the pickup electrodes.

7. The tuning fork of claim 6 wherein the ground electrodes are trimmed to equalize positive and negative feedthrough components and thereby null net feedthrough capacitance.

8. In a method of manufacturing a tuning fork for use in a rate sensor, the steps of: forming a body of piezoelectric material with a base and a pair of elongated vibratory tines extending from the base, mounting drive high electrodes opposite each other on front and rear surfaces of each of the tines, mounting drive low electrodes laterally adjacent to the drive high electrodes along edges of the tines, and mounting pickup high and pickup low electrodes along edges of the tines opposite the drive low electrodes, with all of the electrodes being located substantially equidistant from the base.

9. The method of claim 8 wherein the drive low electrodes are positioned along inner edge portions of the tines, and the pickup high and pickup low electrodes are positioned along outer edge portions of the tines.

10. The method of claim 8 wherein the tines are positioned symmetrically about a longitudinally extending axis.

11. The method of claim 8 including the steps of connecting a drive circuit to the drive electrodes, and connecting a sensing circuit to the pickup electrodes.

12. The method of claim 8 wherein the tines are brought together in a V-shaped crotch toward the base.

13. The method of claim 8 wherein ground electrodes are mounted on the upper and lower surfaces of the tines between the drive high electrodes and the outer edges of the tines, the ground electrodes being substantially coextensive in length with the drive high electrodes and providing shielding between the drive high electrodes and the pickup electrodes.

14. The method of claim 13 including the step of trimming the ground electrodes to equalize positive and negative feedthrough components and thereby null net feedthrough capacitance.

* * * * *